UNITED STATES PATENT OFFICE.

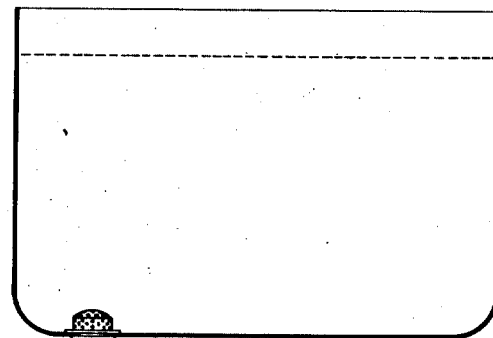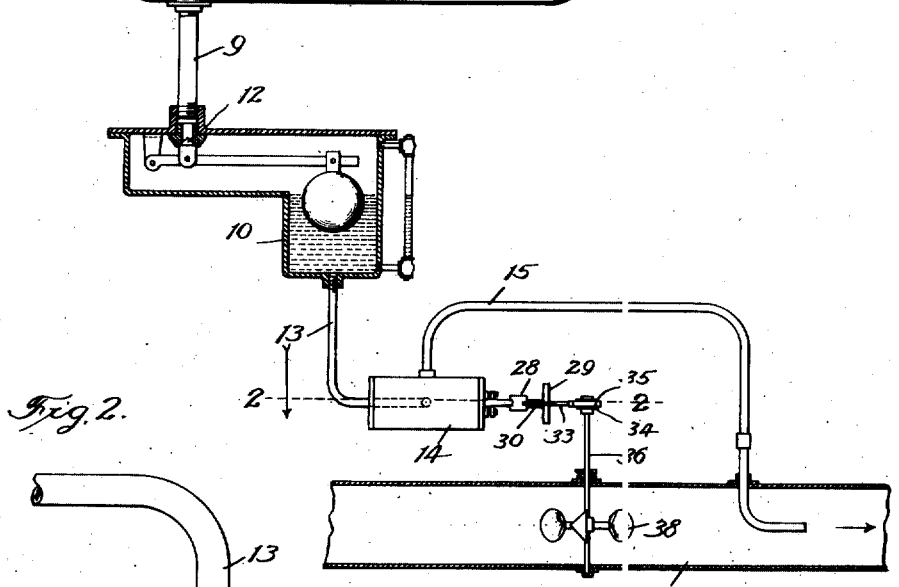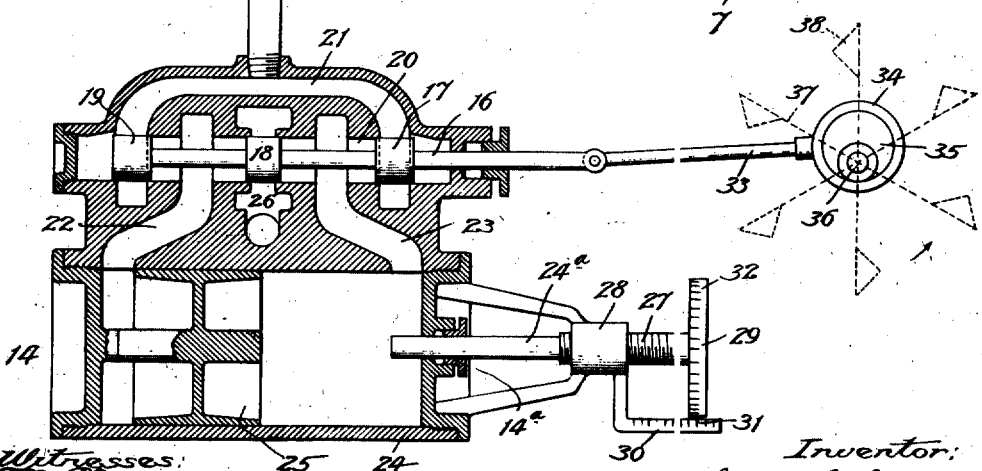

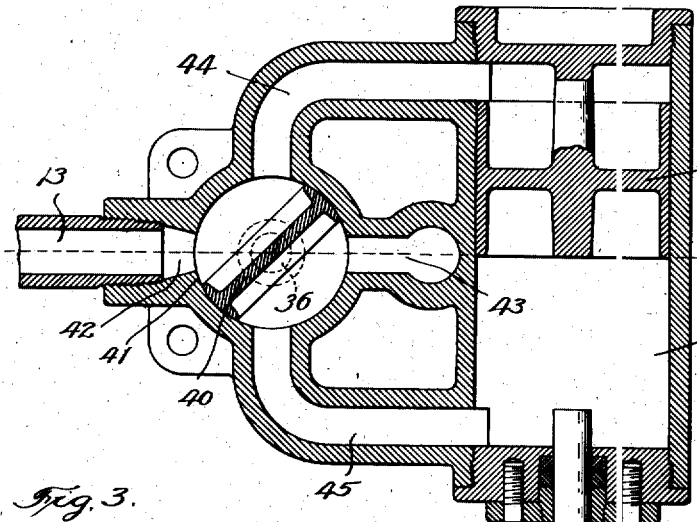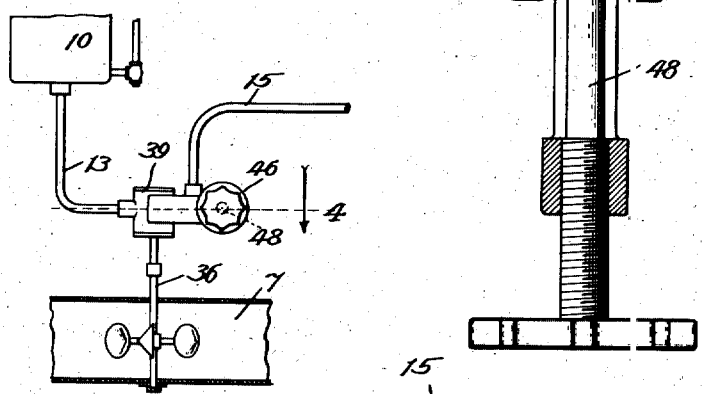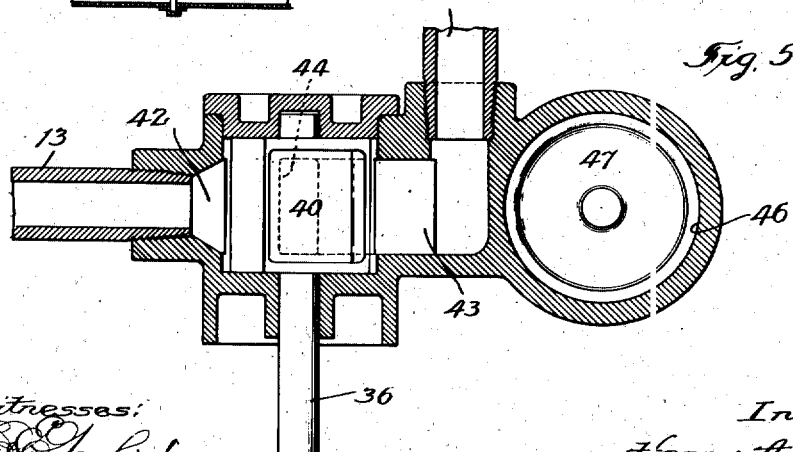

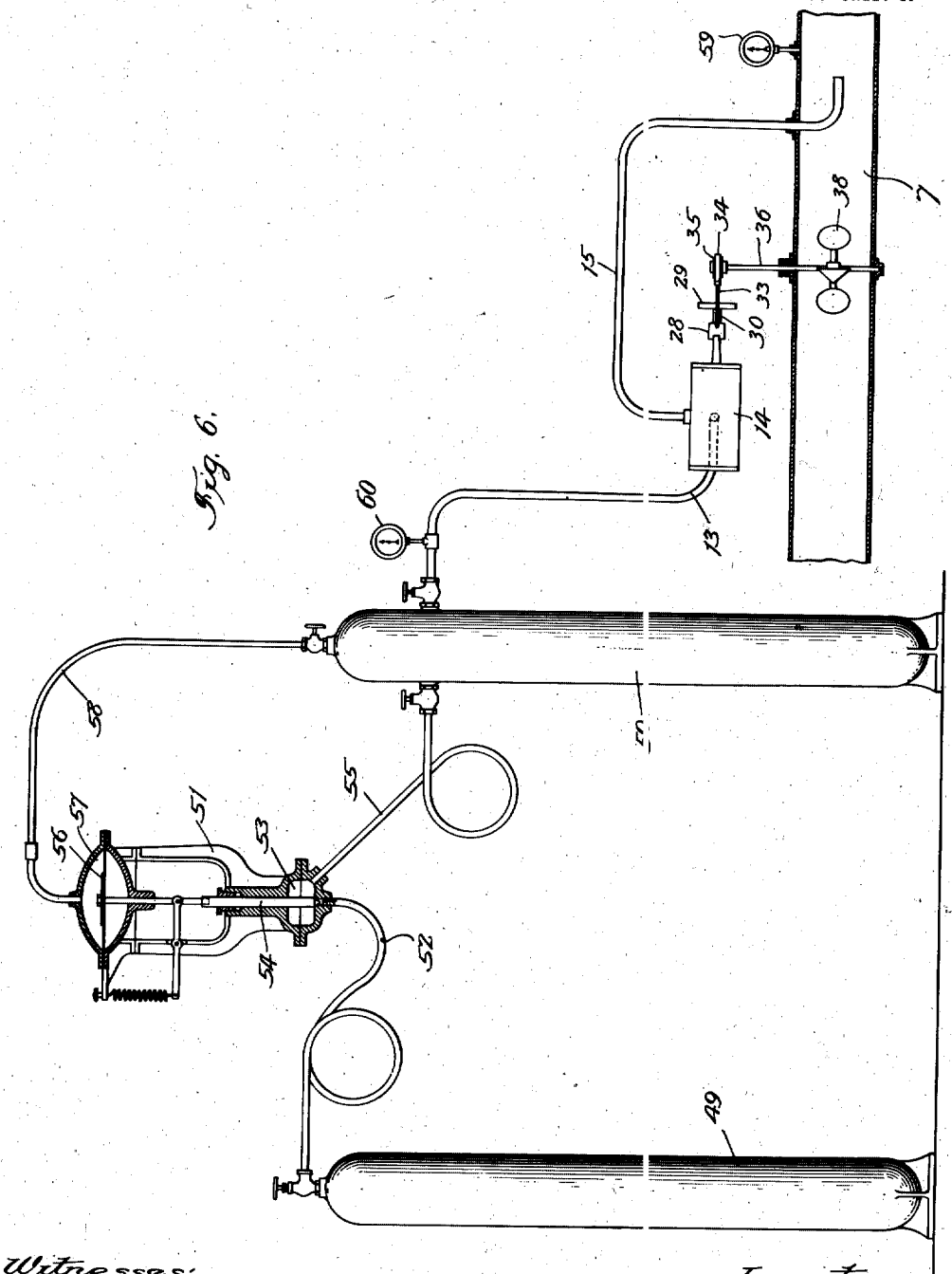

HENRY A. ALLEN, OF CHICAGO, ILLINOIS.

PROPORTIONING FEEDING DEVICE.

1,223,021.   Specification of Letters Patent.   Patented Apr. 17, 1917.

Application filed July 10, 1916. Serial No. 108,430.

*To all whom it may concern:*

Be it known that I, HENRY A. ALLEN, a citizen of the United States, residing at Chicago, in the county of Cook and State of Illinois, have invented a new and useful Improvement in Proportioning Feeding Devices, of which the following is a specification.

My invention relates more particularly to mechanism for proportioning the feed of a chemical either in liquid or gaseous form, to a fluid in flowing condition, as for example, in the case of water purification, as for municipal consumption, feed-water for boilers and water for manufacturing and other purposes, which require chemical treatment of the water, it being common practice in filtration plants to use a coagulant, such as sulfate of aluminum and sulfate of iron and lime, and for purposes of sterilization, "liquid chlorin" or "chlorin gas" or other suitable chemical solution.

In all of the treatments above referred to, as well as other treatments involving the mixing of one fluid with another, it is desirable, and necessary for effecting the best results, that the proportions of the fluids brought together for intermixture be maintained substantially constant. In other words, assuming that the chemical is to be fed into water, for example for purification purposes, it is desirable that the proportion of the chemical to a given amount of water into which it is to be fed remain a constant, regardless of fluctuations in the flow of the water, and thus effect uniform treatment of the water.

My primary object is to provide for such proportioning of the fluids, regardless of changes in the rate of flow of the fluid into which the other fluid is to be introduced; and to provide for the varying of the proportions of the fluids under the control of an operator.

Referring to the accompanying drawings, Figure 1 is a view, partly diagrammatic, of an apparatus involving my invention, this view showing it in connection with a conduit through which water to be treated flows. Fig. 2 is an enlarged section taken at the line 2 on Fig. 1 and viewed in the direction of the arrow. Fig. 3 is a view like Fig. 1, but with certain parts thereof omitted, illustrating another form in which my invention may be provided. Fig. 4 is an enlarged section taken at the line 4 on Fig. 3 and viewed in the direction of the arrow. Fig. 5 is a section taken at the line 5 on Fig. 4 and viewed in the direction of the arrow; the two forms of the invention illustrated in these figures being adapted, more particularly, for regulating the feed of a chemical in solution; and Fig. 6, a view similar to Fig. 1, showing a further modification of the invention, in a form suitable for use where the chemical to be introduced into water is in the form of gas.

Referring more particularly to Figs. 1 and 2, a conduit through which the water for treatment flows, and which may be in the form of a pipe or a trough, is represented at 7, and, in the particular arrangement illustrated, is designed to receive for mixture with the water flowing therethrough, a chemical in certain proportions which is contained in the receptacle 8, which, by preference, communicates through a pipe 9 with the interior of a constant head-device 10 formed of the casing 11 into which the pipe 9 opens and a float-valve 12 controlling communication between the pipe 9 and the casing 11. A pipe 13 leads from the lower end of the casing 11 into a valve-casing 14, the outlet of which is represented at 15 and terminates in such position that the solution discharged therethrough from the casing 11, as hereinafter described, will become mixed with the water or other fluid flowing through the conduit 7, this pipe 15 preferably extending into the conduit 7 through a wall thereof and centrally of the stream to effect the most desired mixture.

According to my invention, the feeding of the chemical solution from the casing 11 into the conduit 7 is effected by valve mechanism controlled by a device operated by the force of the water or other fluid flowing through the conduit 7, and a pumping element actuated by the head produced by the solution in the casing 11 and controlled by the said valve mechanism, the device which is operated by the flow of water through the conduit 7 and controls the valve, being preferably of such character that it will be accurately responsive to changes in the rate of flow of the water or other fluid flowing through the pipe 7.

According to the embodiment of the invention illustrated in Figs. 1 and 2, the valve element referred to comprises a stem 16 carrying three heads 17, 18 and 19, which are reciprocable with the rod 16 in a bore 20 in the casing 14. The pipe 13 opens through a side of the casing 14 into a passage 21 adapted to alternately communicate at its ends in the movement of the said valve, with passages 22 and 23, opening into the opposite ends of cylinder 24 in which the pumping element, in the form of a floating piston 25, has sliding fit. The pipe 15 communicates with a port 26 adapted to alternately communicate with the passages 22 and 23 in the operation of the valve, as hereinafter described. The cylinder 24 is provided at one end with an adjustable stop-device for varying the stroke of the piston 25, it being preferred that this stop-device be constructed as shown, namely, by forming it of a rod 24$^a$ extending into one end of the cylinder 24 through a stuffing-box 14$^a$, with its opposite end threaded, as represented at 27, at which it engages a threaded opening in a head 28 secured to the cylinder, the outer end of this rod being provided with a hand-wheel 29 which coöperates with an arm 30 on the head 28, these parts being provided with scales 31 and 32 affording an arrangement like that of a micrometer for adjusting with great precision the extent of the protrusion of the rod 24$^a$ into the cylinder 24.

The valve in the casing 14, in the particular arrangement shown, is connected with a pitman 33 terminating in an eccentric-strap 34 surrounding an eccentric 35 secured on a shaft 36 which extends into the conduit 7 and carries the fluid-driven-device hereinbefore referred to, and which, in the construction illustrated, is of a common and well known form comprising radial arms 37 secured to the shaft 36 and terminating in cups 38.

In the operation of the device the solution to be fed into the water as it passes through the conduit 7, is charged into the receptacle 8 from which it flows into the casing 11, wherein a constant head of the solution is maintained through the medium of the valve-device 12. The flowing of the fluid through the conduit 7 operates the shaft 36 and, consequently, the valve-device in the casing 14 to alternately open the supply-pipe 13 to the passages 22 and 23 and the port 26 with these same passages.

Assuming the apparatus to be in the position illustrated in the drawings, the rotation of the power-device in the conduit 7, in the direction of the arrow in Fig. 2, shifts the valve-device 16 to the left in said figure, causing the passage 21 to communicate with passage 22, and passage 23 to communicate with outlet-passage 26, in this position of the valve the head 18 extending between the passage 22 and 26 and the head 17 extending between the passages 21 and 23. In the said position of the valve the solution passes downwardly through the pipe 13, bore 21 and passage 22 into the left-hand end of the cylinder 24 behind the piston 25, forcing the latter to the right in Fig. 2 until it strikes the stop 24$^a$, the piston in this movement forcing from the right-hand end of the cylinder 24 and into and through the pipe 15 and into the conduit 7, the solution contained in the right-hand end of the cylinder 24, the piston 25 remaining in said shifted position until the rotation of the device in the conduit 7 moves the valve 16 to the right in Fig. 2 to its extreme position in which the passage 22 is closed to the passage 21 but open to the passage 26, and the passage 23 is open to the passage 21 but closed to the passage 26, whereupon the fluid entering the valve-casing 14 through the pipe 13 passes through the passage 21, bore 20 and passage 23, into the right-hand end of the cylinder 24, driving the piston 25 to the left in this figure and forcing into the pipe 15 for discharge into the conduit 7, the solution which previously was the motive power for driving the piston 25 to the right in Fig. 2. It will thus be understood that the pressure exerted by the solution supplied through the pipe 13 must be sufficient to overcome the friction of the parts of the device and the back-pressure exerted on the pipe 15 by the fluid flowing through the conduit 7, and this may be provided for by placing the tank 11 at such elevation as will produce this desired head, or by effecting this difference of pressure in any other suitable way.

It will also be understood from the foregoing that the number of strokes made by the piston 25 for any given length of time is dependent on the speed at which the valve 16 is reciprocated, and that this is dependent on the speed at which the fluid-operated-device connected therewith and located in the conduit 7, is driven, the speed of rotation of the latter being in turn dependent on the speed at which the fluid flows through the conduit 7, and thus the device operates to automatically regulate the flow of solution into the conduit 7 to maintain the proportions constant, regardless of variations in the flow of the fluid into which it is to be introduced, in the conduit 7.

The mechanism may be set to deliver any desired proportionate amount of chemical solution to the conduit 7, by adjusting the adjustable stop-device 24$^a$, inasmuch as by adjusting this device the length of the stroke of the piston 25 may be accurately regulated, the length of stroke determining the amount of solution discharged through the pipe 15 into the conduit 7 with each movement of the piston 25 lengthwise of the cylinder 24.

Referring to Figs. 3, 4 and 5 of the drawings, wherein I have disclosed a modification of the valve mechanism which may be employed, the valve-casing into which the pipe 13 opens and from which the pipe 15 extends, is represented at 39. The valve in this case is of the rotary type, the valve proper being shown at 40 and being in the form of a disk rotatable in the valve-chamber 41 of the casing 39 and connected with the shaft 36 of the fluid-driven-device in the conduit 7. The pipe 13 opens into the valve-chamber 41 through a port 42 diametrically opposing a port 43 which communicates with the pipe 15, the chamber 41 containing oppositely-extending passages 44 and 45 disposed preferably at 90° angles to the ports 42 and 43 and opening into the ends of a cylinder 46 containing a floating-piston 47, like the piston 25, the cylinder 46 containing an adjustable stop-device 48 corresponding with the stop-device 24ª of Fig. 2.

The principle and mode of operation of this valve mechanism is practically the same as that disclosed in Figs. 1 and 2, the rotation of the valve 40 serving in one position to open one end of the cylinder 46 to the inlet 13 through the passage 44 and opening the discharge-end of the cylinder to the pipe 15 through the passages 45 and 43, and when rotated to another position by the fluid-operated-device in the conduit 7, to reverse communication of the cylinder with the pipes 13 and 15 to effect introduction of the solution into the opposite end of the cylinder. With this construction, as with the one previously described, the amount of solution which is forced through the pipe 15 is dependent entirely on the speed at which the valve 40 is rotated and the adjustment of the stop-device 48, but with any adjustment of the stop-device 48 the proportion of the solution, relative to the fluid into which it is introduced, remains a constant.

It may here be stated that while both of the constructions just described involve, as shown, the use of a constant head-device, this is not indispensable to the practising of my invention, though it tends to more uniformity in the treatment of the water in the conduit 7. If the constant head-device is not used, the pipe 9 can be directly connected with the inlet of the casing 14 or 39, as the case may be.

In Fig. 6 I have shown, by an arrangement more or less diagrammatic, a way of utilizing the invention where the chemical to be introduced into the fluid flowing through the conduit 7, is in the form of gas under pressure. A tank containing the gas under pressure to be introduced into the water in the conduit 7, is represented at 49, and while this tank may be directly connected with the pipe 13 opening into the inlet of the valve 14, it is preferred that the gas be supplied to the valve-device, which in the construction shown is the same as that shown in Figs. 1 and 2, under constant pressure. To this end a second tank 50 is provided and interposed between the tanks 49 and 50 and in communication therewith is a pressure-regulator 51 which may be of any suitable construction and which is well known in the art. Suffice it to say that the tank 49 is connected by a pipe 52 with a chamber 53 controlled by a valve 54 and opening into a pipe 55 communicating with the tank 50. The valve 54, which is reciprocable and tends to seat under spring action, is connected with a diaphragm 56 in a chamber 57, which is in communication by a pipe 58, with the tank 50, the arrangement being such that the pressure in the tank 50 exerted against the diaphragm 56 controls the supply of gas to the tank 50, which is thus maintained under constant pressure and which flows through the pipe 13 into the casing 14 for actuating the sliding piston 25 therein, as explained of the construction shown in Figs. 1 and 2, it being necessary that the pressure in the tank 50 be sufficiently great to overcome the friction of the parts of the construction and back-pressure exerted on the interior of pipe 15 by the fluid in the conduit 7. To this end it is preferred that gages 59 and 60 be provided in communication with the conduit 7 and pipe 13, respectively, in order that the operator may at all times determine whether or not the desired difference in pressures exists for the proper operation of the apparatus.

It will be noted from the foregoing that the power for forcing the liquid or gas, as the case may be, into the conduit 7 to be mixed with the fluid flowing therethrough, is furnished by the head or pressure of the solution or gas, and that the fluid-driven-device in the conduit 7 operates merely to perform the relatively light work of shifting the valve for controlling the flow of the liquid or gas into the pump-cylinder, as hereinbefore described. This is of great advantage, inasmuch as it is necessary, in order that the device operate substantially accurate as a proportioning device, to relieve the relatively sensitive fluid-driven-device, of as much load as possible.

While I have illustrated and described certain forms in which my invention may be provided, I do not wish to be understood as intending to limit it thereto, as the same may be variously modified and altered, without departing from the spirit of my invention.

What I claim as new and desire to secure by Letters Patent is—

1. In apparatus of the character set forth, the combination of a conduit for fluid, a source of fluid under pressure for introduction into the fluid flowing in said conduit, a device driven by the fluid in said conduit, and means operated by the said fluid under pressure and controlled by said device, for effecting the introduction of said fluid under pressure into said conduit.

2. In apparatus of the character set forth, the combination of a conduit for fluid, a source of fluid under a constant pressure for introduction into the fluid flowing in said conduit, a device driven by the fluid in said conduit, and means operated by the said fluid under pressure and controlled by said device, for effecting the introduction of said fluid under pressure into said conduit.

3. In apparatus of the character set forth, the combination of a conduit for fluid, a source of fluid under pressure for introduction into the fluid flowing in said conduit, a device driven by the fluid in said conduit, a pumping element actuated by the said fluid under pressure to discharge into said conduit, valve mechanism controlling the introduction of said fluid under pressure into said pumping element, and means actuated by said device for actuating said valve means.

4. In apparatus of the character set forth, the combination of a conduit for fluid, a source of fluid under pressure for introduction into the fluid flowing in said conduit, a device driven by the fluid in said conduit, a reciprocable pumping element actuated in both directions by the said fluid under pressure and discharging into said conduit, valve mechanism controlling the supply to the pumping element and the discharge therefrom of the said fluid under pressure, and means actuated by said device for actuating said valve mechanism.

5. In apparatus of the character set forth, the combination of a conduit for fluid, a source of fluid under pressure for introduction into the fluid flowing in said conduit, a device driven by the fluid in said conduit, a cylinder having an outlet passage, a piston reciprocable in said cylinder, valve means for controlling the introduction into the cylinder behind the piston and the discharge therefrom into said conduit, of the said fluid under pressure for actuating said piston to produce said discharge, and means actuated by said device for actuating said valve means.

6. In apparatus of the character set forth, the combination of a conduit for fluid, a source of fluid under pressure for introduction into the fluid flowing in said conduit, a device driven by the fluid in said conduit, a cylinder containing inlet and outlet passages, a piston reciprocable in said cylinder and driven by the introduction of the said fluid under pressure into the ends of the cylinder alternately, valve mechanism controlling the alternate communication of the ends of the cylinder with said fluid under pressure and with the outlet of the cylinder, and means actuated by said device for actuating said valve mechanism.

7. In apparatus of the character set forth, the combination of a conduit for fluid, a source of fluid under pressure for introduction into the fluid flowing in said conduit, a device driven by the fluid in said conduit, a reciprocable pumping element operated by the said fluid under pressure to effect the discharge of the fluid into said conduit, an adjustable stop for limiting the movement of said pumping element to vary the amount of fluid discharged into said conduit with each operation of said pumping element, and means actuated by said device for controlling the operation of said pumping element.

8. In apparatus of the character set forth, the combination of a conduit for fluid, a source of fluid under pressure for introduction into the fluid flowing in said conduit, a device driven by the fluid in said conduit, a cylinder containing inlet and outlet passages, a floating piston in said cylinder, adjustable means for regulating the stroke of said piston, valve means controlling the introduction of the said fluid under pressure into the opposite ends of said cylinder alternately and the discharge therefrom into said conduit, and means actuated by said device for operating said valve means.

9. In apparatus of the character set forth, the combination of a conduit for fluid, a source of fluid under pressure for introduction into the fluid flowing in said conduit, a device driven by the fluid in said conduit, a cylinder containing inlet and outlet passages, said inlet passages being adapted to convey the said fluid under pressure into the ends of said cylinder, a floating piston in said cylinder, adjustable means for controlling the stroke of said piston, valve means operating, when actuated, to alternately connect the inlets at the ends of said cylinder with said source of fluid under pressure and with the outlet from said cylinder, said outlet discharging into said conduit, and means actuated by said device for actuating said valve mechanism.

HENRY A. ALLEN.